United States Patent
Manova-Elssibony

(10) Patent No.: US 10,348,138 B2
(45) Date of Patent: Jul. 9, 2019

(54) PROBES ARRANGEMENT

(71) Applicant: Humavox LTD., Kfar-Saba (IL)

(72) Inventor: Asaf Manova-Elssibony, Ramat Gan (IL)

(73) Assignee: Humavox Ltd., Kfar-Saba (IL)

(*) Notice: Subject to any disclaimer, the term of this patent is extended or adjusted under 35 U.S.C. 154(b) by 161 days.

(21) Appl. No.: 15/129,102

(22) PCT Filed: Mar. 26, 2015

(86) PCT No.: PCT/IL2015/050331
§ 371 (c)(1),
(2) Date: Sep. 26, 2016

(87) PCT Pub. No.: WO2015/145451
PCT Pub. Date: Oct. 1, 2015

(65) Prior Publication Data
US 2018/0175674 A1    Jun. 21, 2018

Related U.S. Application Data

(60) Provisional application No. 61/971,279, filed on Mar. 27, 2014, provisional application No. 62/097,750, filed on Dec. 30, 2014.

(51) Int. Cl.
*H01Q 1/22* (2006.01)
*H02J 50/27* (2016.01)
(Continued)

(52) U.S. Cl.
CPC ............. *H02J 50/27* (2016.02); *H01Q 1/22* (2013.01); *H01Q 9/28* (2013.01); *H02J 7/025* (2013.01);
(Continued)

(58) Field of Classification Search
CPC ..................................................... H02J 50/20
See application file for complete search history.

(56) References Cited

U.S. PATENT DOCUMENTS

| | | | |
|---|---|---|---|
| 2012/0153745 A1 | 6/2012 | Pagani | |
| 2012/0200158 A1 | 8/2012 | Takei | |
| 2014/0347244 A1* | 11/2014 | Pagani | H01Q 7/00 343/867 |

FOREIGN PATENT DOCUMENTS

| | | |
|---|---|---|
| CN | 103312051 B | 6/2016 |
| KR | 20120128099 | 11/2012 |

OTHER PUBLICATIONS

Hermann et al. Historical burdens on physics, 110 Closed B field lines. Retrieved from http://www.physikdidaktik.uni-karlsruhe.de/publication/Historical_burdens/110_Closed_field_lines.pdf (Year: 2019).*

(Continued)

*Primary Examiner* — Daniel J Cavallari
(74) *Attorney, Agent, or Firm* — Maxwell L. Minch; GrayRobinson, P.A.

(57) ABSTRACT

The invention is directed to a novel probes arrangement configured to be attached to a receiving unit of a device under charge positioned onto or within a conductive charging structure having a transmitting unit for transmitting RF energy, wherein said probes arrangement comprises at least two probes configured to create a closed electromagnetic field lines between them so as to allow improved coupling between said transmitting unit and said receiving unit regardless of the position and/or the orientation of the device under charge relative to the conductive charging structure. The improved coupling between the receiving unit attached to the probes arrangement and the transmitting unit of the conductive charging structure allows a high RF transfer efficiency between said units.

19 Claims, 3 Drawing Sheets

(51) Int. Cl.
*H01Q 9/28* (2006.01)
*H02J 50/90* (2016.01)
*H02J 50/40* (2016.01)
*H02J 7/02* (2016.01)

(52) U.S. Cl.
CPC .............. *H02J 50/40* (2016.02); *H02J 50/90* (2016.02); *H04R 2460/00* (2013.01)

(56) References Cited

OTHER PUBLICATIONS

Wikipedia contributors. "Conductive wireless charging." Wikipedia, The Free Encyclopedia. Wikipedia, The Free Encyclopedia, Jan. 30, 2019. Web. Feb. 15, 2019. (Year: 2019).*

* cited by examiner

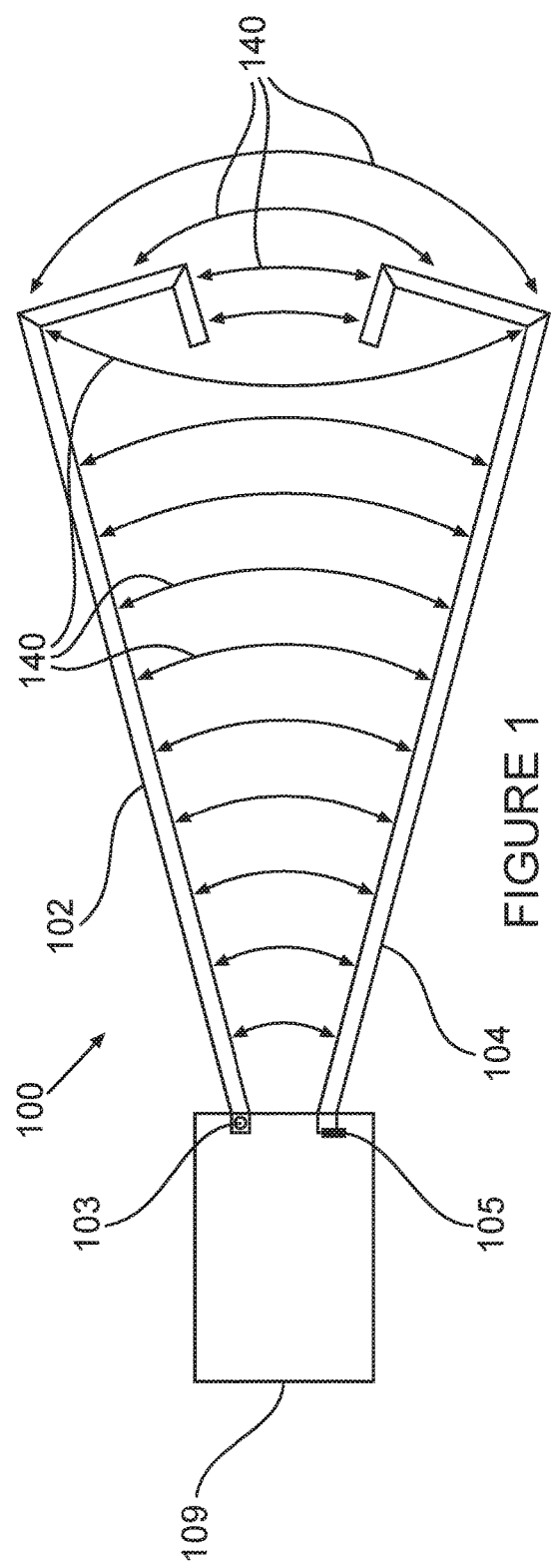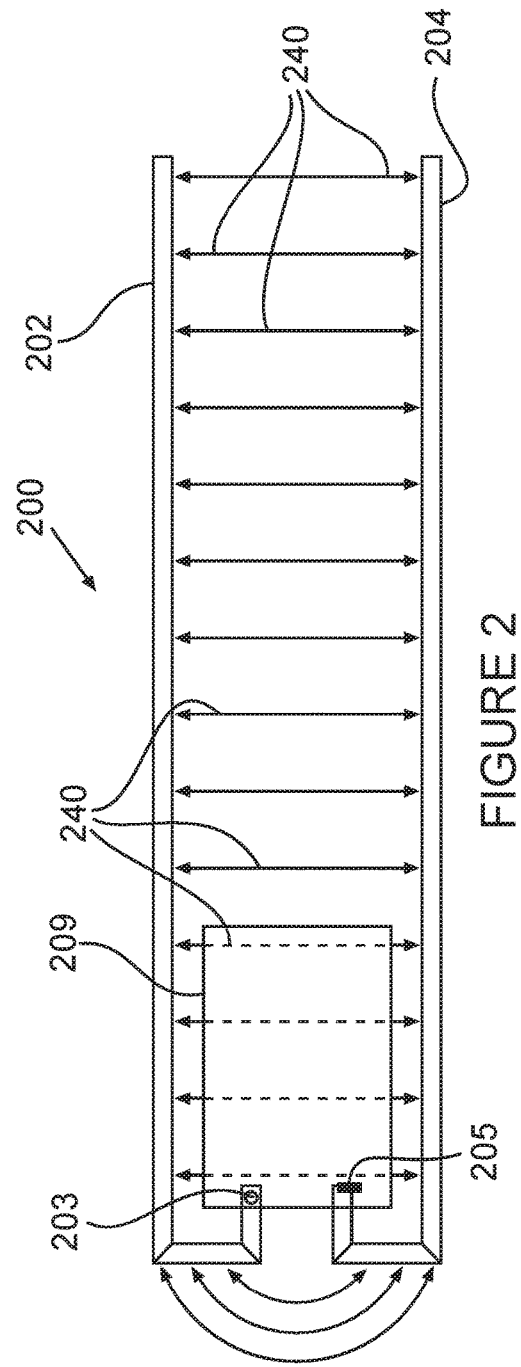

PROBES ARRANGEMENT

FIELD OF THE INVENTION

The present invention is related to a novel probes arrangement for improving RF coupling between a transmitting unit and a receiving unit in wireless charging systems, in general and in a conductive closed/half closed chamber and near field conditions in particular.

BACKGROUND

Wireless charging systems and wireless charging devices are well known in the art. Some examples of such charging systems and devices that are using electromagnetic energy for charging are described in details in international patent publications Nos. WO 2013/118116, WO 2013/179284, and WO 2015/022690 of the same inventor all incorporated herein by reference.

The basic condition for successful and efficient charging in all wireless charging systems based on electromagnetic radiation transmission is to achieve high coupling and high transfer efficiency between the transmitting probe and the receiving probe, i.e. between the transmitting unit of the wireless charging device and the receiving unit of the device under charge (denoted herein after: "DUC").

High coupling between the transmitting probe and a receiving probe is usually obtained in stable unchanging systems where the position and location of the probes are fixed. However, in wireless charging systems, there is a need to allow a certain amount of flexibility and freedom of movement between the transmitting component and the receiving component, so as to maintain high transfer efficiency between the probes regardless of the position and orientation of the chargeable device, since a user may position the device under charge onto/within the wireless charging device in each charging session in a different position and/or orientation.

When using a single probe the ground plat of the receiving unit is used as a RF ground to the receiving probe. However, this ground is significantly small and thus, any environmental changes are influencing the electromagnetic field lines distribution between the probe and the ground, i.e. the sensitivity of the receiving probe as to changes in its position and/or orientation is high.

The sensitivity of a single probe to elements around it is further enhanced when charging is conducted in a close/partially close conductive structure. In such scenario, the charging system is usually designed to obtain high coupling and to have high efficiency of energy transfer at certain position of the transmitting probe relative to the receiving probe as the receiving probe is referenced to specific ground point in the charging system. Upon changing the position and/orientation of the DUC within the charging zone, the steady state of the wireless charging system as designed is breached as the interaction of the receiving probe with the elements around it, such as but not limited to, the walls of the conductive charging device and the transmitting probe changes. This change breach the conditions required to obtain high coupling between the transmitting and the receiving units as the electromagnetic field lines distribution between the receiving probe and the RF ground are being change and interact with other elements in the surrounding, and consequently, the transfer efficiency between the units significantly decreases.

The present invention is aimed to provide a novel probes arrangement configured and operable to improve the stability and the flexibility of the coupling between the charging device and the device under charge by enhancing the stability of the RF coupling between the transmitting and the receiving units and maintaining high transfer efficiency between the units, in a dynamic charging system where the position and the orientation of the device under charge changes from one charging session to the other. The novel probes arrangement may be used in different environments including wireless charging systems within a close/half close charging chamber and open near field environments.

SUMMARY OF THE INVENTION

The subject matter disclosed herein is directed to a novel probes arrangement configured to be attached to a receiving unit of a device under charge positioned onto or within a conductive charging structure having a transmitting unit for transmitting RF energy, wherein said probes arrangement comprises at least two probes configured to create a closed electromagnetic field lines between them so as to allow improved coupling between said transmitting unit and said receiving unit regardless of the position and/or the orientation of the device under charge relative to the conductive charging structure.

The improved coupling between the receiving unit attached to the probes arrangement and the transmitting unit of the conductive charging structure allows a high RF transfer efficiency between said units.

The conductive charging structure having a transmitting unit is adapted to confine the transmitted RF energy to a charging zone, and said probes arrangement is configured to increase the dimensions of the charging zone relative to at least one of the following characters: (a) the number of probes in the probes arrangement; and (b) the structure and/or the positioning of the entire probes arrangement projection over X-Y-Z axis.

In some embodiments of the invention, the at least two probes have a similar structure and/or length, while in some other embodiments of the invention, the at least two probes differ from the other probe/s in structure and/or length. In some other embodiments of the invention, at least one probe may be branched.

The at least two probes may create a two dimensional or a three dimensional structure over axis X-Y-Z wherein, the lines of the electromagnetic field are arranged between and/or around them so as to create a microenvironment between and/or around them configured to minimize changes in the electromagnetic field occurring as a result of changes in the position and/or orientation of the device under charge.

The subject matter disclosed herein is further directed to a wireless chargeable device comprising the novel probes arrangement as described above.

The invention is further directed to a wireless chargeable device comprising at least a probes arrangement functionally attached to a receiving unit, said probes arrangement comprises at least two probes configured to create a closed electromagnetic field between them so as to allow improved coupling between said transmitting unit and said receiving unit regardless of the position and/or the orientation of the wireless chargeable device relative to the conductive charging structure, and a receiving unit. The improved coupling between the receiving unit attached to the probes arrangement and the transmitting unit of the conductive charging structure allows a high RF transfer efficiency between said units.

The conductive charging structure having a transmitting unit is adapted to confine the transmitted RF energy to a charging zone, and said probes arrangement is configured to increase the dimensions of the charging zone relative to at least one of the following characters: (a) the number of probes in the arrangement; and (b) the structure and/or the positioning of the entire probes arrangement projection over X-Y-Z axis. In some embodiments, the at least two probes have a similar structure and/or length, while in other embodiments, the at least two probes differ from the other probe/s in structure and length. In some embodiments, at least one probe may be branched. In further embodiments of the invention, the at least two probes may create a two dimensional or a three dimensional structure over axis X-Y-Z, wherein lines of the electromagnetic field are arranged between and/or around them so as to create a microenvironment around them configure to minimize changes in the electromagnetic field occurring as a result of changes in the position and/or orientation of the device under charge.

The probes arrangement of the wireless chargeable device is preferably attached to the receiving unit and configured to stabilize the receiving unit in a manner that the dimensions of the charging zone created increase, such that efficient charging of the chargeable device is maintained regardless of the position and/or orientation of the chargeable device. Additionally and/or alternatively, the probes arrangement attached to the receiving unit are configured to minimize electromagnetic influence created by the conductive charging device and/or reflected from the surroundings for obtaining high RF energy transfer efficiency to the receiving unit of the wireless chargeable device.

BRIEF DESCRIPTION OF THE DRAWINGS

Examples illustrative of embodiments of the disclosure are described below with reference to figures attached hereto. In the figures, identical structures, elements or parts that appear in more than one figure are generally labeled with the same numeral in all the figures in which they appear. Dimensions of components and features shown in the figures are generally chosen for convenience and clarity of presentation and are not necessarily shown to scale. Many of the figures presented are in the form of schematic illustrations and, as such, certain elements may be drawn greatly simplified or not-to-scale, for illustrative clarity. The figures are not intended to be production drawings.

The figures (Figs.) are listed below.

FIG. 1 is a schematic illustration of an example of a novel probe arrangement configured and operable to allow improved coupling range and stability between receiving and transmitting units of a wireless charging system and the close electromagnetic filed lines distribution between the two probes.

FIG. 2 is a schematic illustration of another example of a novel probe arrangement for improving the coupling range and stability between receiving and transmitting units of a wireless charging system and the close electromagnetic filed lines distribution between the two probes.

DESCRIPTION OF VARIATIONS OF THE INVENTION

Figure 3A:
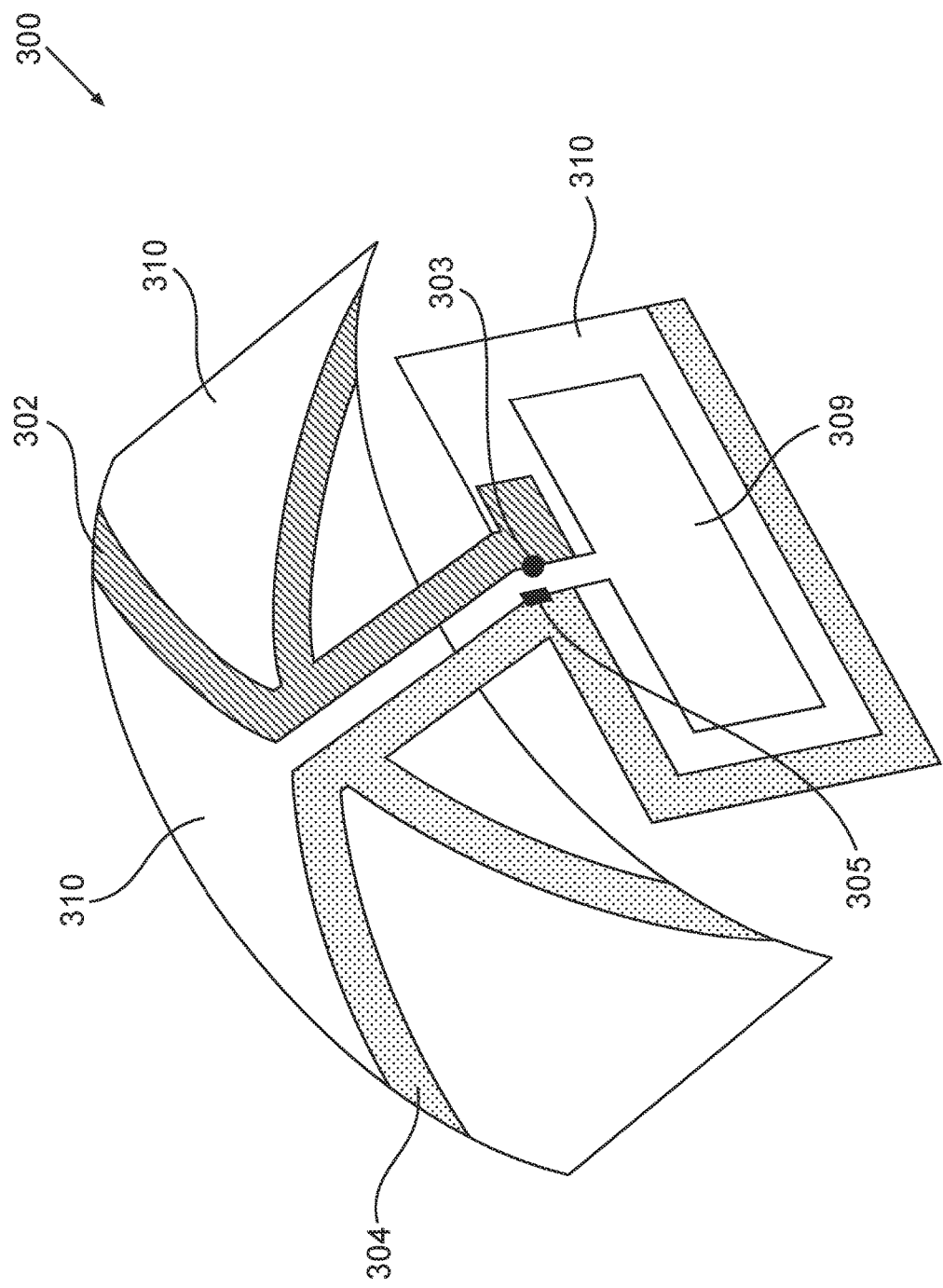
FIG. 3 is a schematic illustration of one another example of a novel probe arrangement for improving the coupling range and stability between receiving and transmitting units of a wireless charging system, wherein the device under charge that comprises the receiving antenna is a hearing aid device.

In the following description, various aspects of novel probes arrangement configured and operable to allow improved coupling between receiving and transmitting units of a wireless charging system is described. For the purpose of explanation, specific configurations and details are set forth in order to provide a thorough understanding of the arrangement.

Although various features of the disclosure may be described in the context of a single embodiment, the features may also be provided separately or in any suitable combination. Conversely, although the disclosure may be described herein in the context of separate embodiments for clarity, the disclosure may also be implemented in a single embodiment. Furthermore, it should be understood that the disclosure can be carried out or practiced in various ways, and that the disclosure can be implemented in embodiments other than the exemplary ones described herein below. The descriptions, examples and materials presented in the description, as well as in the claims, should not be construed as limiting, but rather as illustrative.

Terms for indicating relative direction or location, such as "right" and "left", "up" and "down", "top" and "bottom", "horizontal" and "vertical", "higher" and "lower", and the like, may also be used, without limitation.

In accordance with embodiments of the invention, the novel probes arrangement provided herein comprises at least two probes configured to improve the flexibility of the coupling effect and to allow high transfer efficiency of RF energy between the transmitting probe of a wireless charging device and the receiving probe of a DUC, by enhancing the stability of the RF coupling between the transmitting probe and the receiving probe and minimizing the surroundings effect on the coupling between the probes.

The increased stability of the charging system and the flexibility to changes in the electromagnetic field resulting from different positioning of the DUC within the charging zone is mainly obtained by the addition of at least one additional receiving probe to the receiving unit so as to provide the first probe a constant influence in its vicinity in order to minimize the influence of other elements in the surroundings on the first probe that may breaches the steady state of the charging system, decrease the coupling between the transmitting and the receiving units and lead to decreasing of energy transfer efficiency between the units.

When using a single probe, any change in the position and/or orientation between the transmitting probe and the DUC as well as electromagnetic influences from the surroundings (in near field conditions) and/or from the walls of the conductive charging device (either closed or partially closed chamber) affect the coupling between the transmitting unit and the receiving unit that is relatively unstable and as such, leads to poor and unstable charging of the DUC as the primary conditions that were settled for obtaining high coupling between the probes and high transfer efficiency of RF energy between the transmitting probe and the receiving probe are breached.

In accordance with the novel probes arrangement provided herein, the reference point of the receiving probe remains stable in spite of electromagnetic changes that occur in the charging zone due to surroundings effects. This is achieved thanks to the addition of at least one another probe to the receiving probe in a manner that creates a stable "micro-environment" between and/or around the probes arrangement as the lines of the electromagnetic field are now being closed between the at least two probes of the probes arrangement. Thus, any changes in the position and/or orientation of the DCU with the novel probe that may lead to changes in the electromagnetic field around the receiving probe due to changes in the interaction of the receiving probe with the transmitting probe and/or the influence of the walls of the conductive charging device are minimized as these changes also influence the additional probe/s and since the influence on both probes is mutual, the lines of the electromagnetic field between the receiving probes is maintained in spite of the changes occurred. Thus, the outer influences on the receiving probe are now being minimized as the addition of the at least one another probe to the first probe creates a constant influence on the first probe and thus, the stability of the receiving unit attached to the novel probes arrangement increase.

Thus, the novel probes arrangement of the invention is aimed to enhance the stability of the receiving unit regardless to the position and orientation of the DUC onto or within the charging device, and allows high transfer efficiency of RF energy between the transmitting probe and the receiving probes arrangement.

Additionally, with the novel probes arrangement of the invention, the efficiency of the rectifying unit relative to the efficiency achieved when using a single probe at the same parameters also increase. Therefore, the novel probes arrangement allows improved wireless charging process in dynamic, flexible charging conditions.

The novel probes arrangement may be used in different wireless charging environments including a closed conductive charging chamber, partially closed conductive charging chamber, and in open near field environments.

Reference is now made to the figures.

FIGS. 1 and 2 are schematic illustrations of two examples of a novel probes arrangement configured and operable to allow improved coupling between a receiving unit of a DUC and a transmitting unit of a wireless charging device in wireless charging system in accordance with variations of the invention. In addition to the improved coupling, the novel probes arrangement provided herein is further configured and operable to provide an enhanced flexibility as to the positioning of the receiving unit relative to the transmitting unit compared to prior art probes in which improved coupling may be obtained only upon restrict relations between the location of the transmitting unit with reference to the receiving unit, and any movement of one of the units effects the coupling between the units and decrease the transfer efficiency of RF energy between them. The novel probes arrangement is aimed to overcome this problem.

In FIG. 1, the novel probes arrangement comprises at least two probes 102 and 104, wherein first probe 102 is configured to be connected to a positive (+) input 103 of a receiving unit 109. The other probe 104 in the probe arrangement configured to be connected a negative (−) input 105 of receiving unit 109.

As illustrated in the figure, the close electromagnetic field lines 140 are distributed around and between the two probes 102 and 104, thus, a stable microenvironment is created around the receiving probes arrangement that minimize the influence of changes in the electromagnetic field that may occur due to changes in the position of the DUC relative to the transmitting probe that in a single probe structure would breach the steady state of charging system and decrease or even avoid the coupling between the transmitting probe and the receiving probe. The created "micro-environment" further minimize additional influences that may occur due to the change in the position of the DUC such as interference in the electromagnetic field resulting from close vicinity of the DUC to the conductive walls of the wireless charging device or from the surrounding in near field conditions, and influence that may occur due to the change in the position of the DUC relative to the transmitting probe.

In some embodiments of the invention the novel probes arrangement may comprise three or more probes (not shown). In such embodiments, several parallel circuits comprised in the receiving unit may be referenced to the same negative (−) or positive (+) probes of the probes arrangement.

The specific configuration of the probes may vary at least in the following parameters: the structure of the two probes, their length, the angle in-between them, and the connection of each one of them to the receiving unit according to the space available in the device under charge (DUC).

Another configuration of the novel probes arrangement is illustrated in FIG. 2, wherein probe 202 is connected to a positive (+) input 203 of a receiving unit 209 of a DUC, while probe 204 is connected to a negative (−) input 205 of the receiving unit 209. The lines of the electromagnetic field 240 are arranged between the probes as denoted in the figure and increase the stability of the receiving unit to changes in the electromagnetic field that may occur due to changes in the position and/or orientation of the DUC relative to the transmitting unit of the charging device.

In some embodiments of the invention, the novel probes arrangement provided may comprises two identical probes. In some other embodiments of the invention, the novel probes arrangement may comprise different receiving probes as illustrated below with reference to FIG. 3.

Figure 3B:
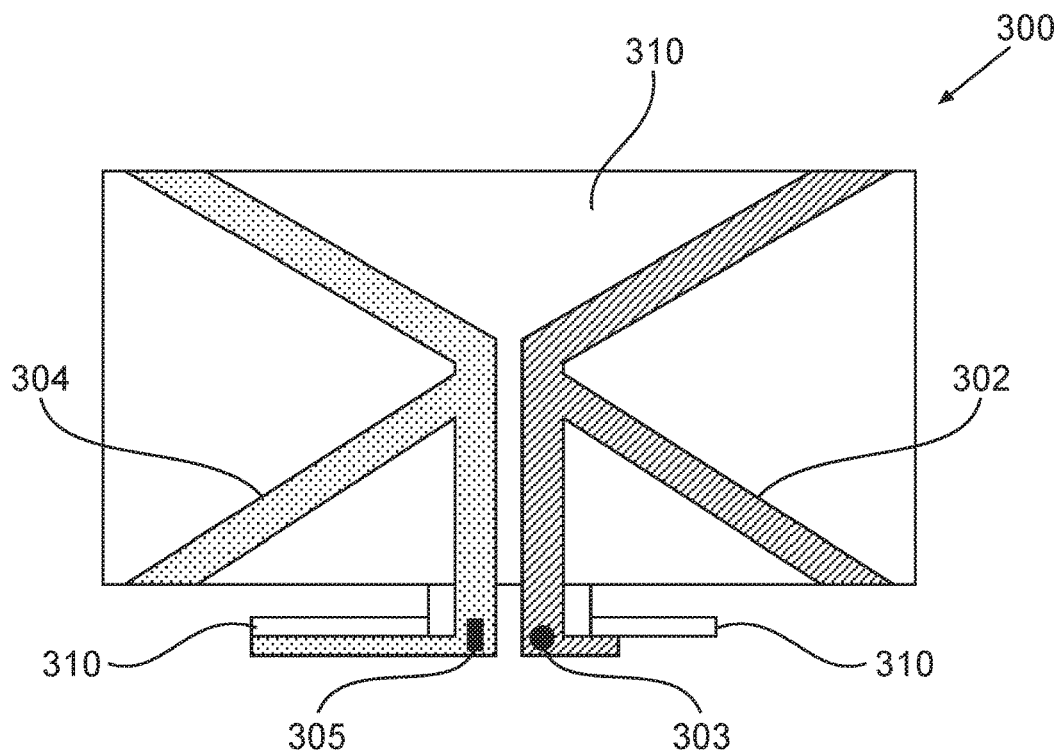
Figure 3C:
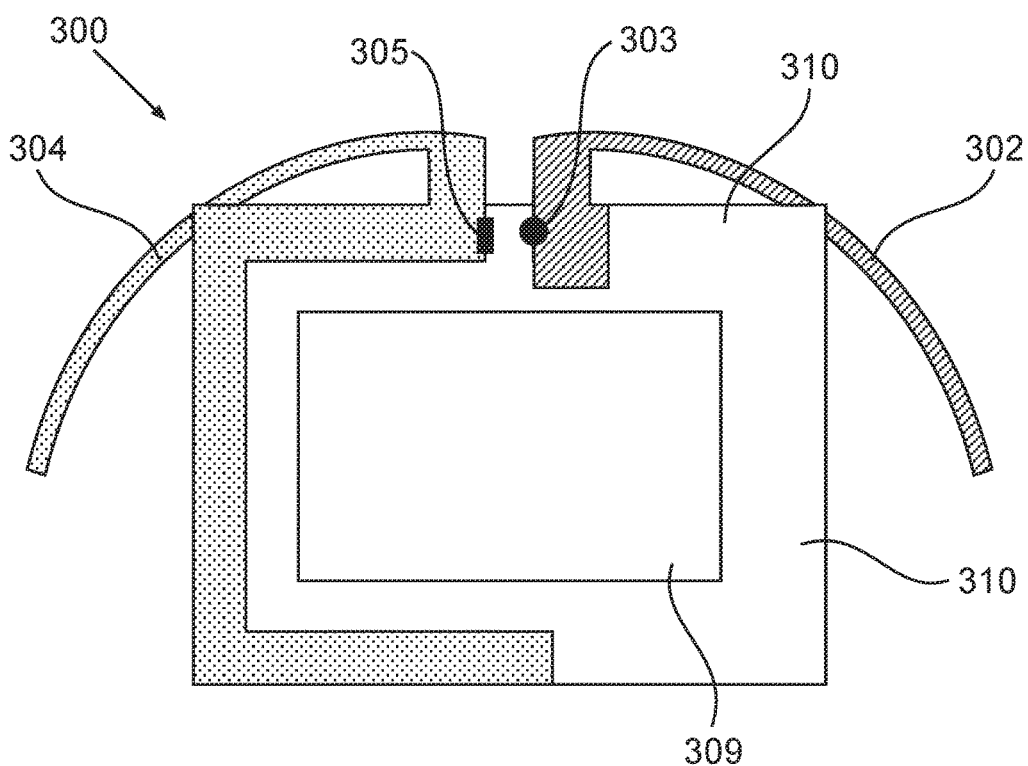

FIGS. 3A-3C are schematic isometric view, front view and top view illustrations of one another example of a novel probes arrangement 300 configured to improve the coupling between receiving and transmitting units of a wireless charging system. Probe arrangement 300 is adapted for use in hearing aids. In this example, probes arrangement 300 comprises a first probe 302 connected to a positive (+) input 303, and a second probe 304 connected to negative (−) input 305. First and second probes 302, 304 are printed on a flex PCB 310 that among other things comprises a receiving unit 309. Flex PCB 309 further serves as a supporting structure for the first and the second probes that in this specific example have various dimensions over axis Z-X-Y-Z and are also branched. The usage of flexible electronics, electronics is a new technology that allows assembling electronic circuits by mounting electronic devices on flexible plastic substrates, such as but not limited to polyimide, PEEK or transparent conductive polyester.

It should be clear that the description of the embodiments and attached Figures set forth in this specification serves only for a better understanding of the invention, without limiting its scope. It should also be clear that a person skilled in the art, after reading the present specification could make adjustments or amendments to the attached Figures and above described embodiments that would still be covered by the present invention.

The invention claimed is:

1. A probes arrangement configured to be attached to a receiving unit of a device under charge positioned onto or within a closed or partially closed conductive charging structure or in a near field environment having a transmitting unit for transmitting RF energy, wherein said probes arrangement comprises:
    at least two probes configured to create a closed electromagnetic field lines between said probes, wherein said configuring is selected from adjusting the structure (i.e.

shape) of the at least two probes, the length of the probes, the angle between pairs of probes, the connection of each probe to the receiving unit, or combinations thereof;

wherein said configuration of the probes allow improved coupling between the transmitting unit and the receiving unit regardless of the position or the orientation of the device under charge relative to the conductive charging structure or near field environment; and wherein said at least two probes (102, 104; 202, 204; 302, 304) are disposed to create a two dimensional or a three dimensional structure over axis X-Y-Z and wherein, lines of the electromagnetic field are arranged between them, said closed electromagnetic field lines created by said at least two probes (102, 104; 202, 204; 302, 304) creating a microenvironment between them, minimizing changes in the electromagnetic field occurring as a result of changes in the position and/or orientation of the device under charge.

2. The probes arrangement according to claim 1, wherein said improved coupling between the receiving unit attached to the probes arrangement and the transmitting unit of the conductive charging structure or near field environment allows a high RF transfer efficiency between said units by enhancing the stability of the RF coupling between the probes and minimizing the surroundings effect on the coupling between the probes.

3. The probes arrangement according to claim 1 wherein said conductive charging structure or near field environment having a transmitting unit is adapted to confine the transmitted RF energy to a charging zone, and said probes arrangement is configured to increase the dimensions of the charging zone relative to at least one of the following characters: (a) the number of probes in the probes arrangement; and (b) the structure or the positioning of the entire probes arrangement projection over X-Y-Z axis.

4. The probes arrangement according to claim 1 wherein said at least two probes have a similar structure or length.

5. The probes arrangement according to claim 1 wherein said at least two probes differ from the other probes in structure or length.

6. The probes arrangement according to claim 1 wherein at least one probe is branched.

7. A wireless chargeable device comprising the probes arrangement of claim 1.

8. The probes arrangement according to claim 2, wherein said conductive charging structure or near field environment having a transmitting unit is adapted to confine the transmitted RF energy to a charging zone, and said probes arrangement is configured to increase the dimensions of the charging zone relative to at least one of the following characters: (a) the number of probes in the probes arrangement; and (b) the structure or the positioning of the entire probes arrangement projection over X-Y-Z axis.

9. The probes arrangement according to claim 2 wherein said at least two probes have a similar structure or length, differ from the other probes in structure or length, or wherein at least one probe is branched.

10. The probes arrangement according to claim 2, wherein said at least two probes create a two dimensional or a three dimensional structure over axis X-Y-Z and wherein, lines of the electromagnetic field are arranged between or around them so as to create a microenvironment between or around them configured to minimize changes in the electromagnetic field occurring as a result of changes in the position or orientation of the device under charge.

11. A wireless chargeable device configured to be charged by a closed or partially closed conductive charging structure or in near field environment, the wireless chargeable device comprising:

a receiving unit;

at least one probes arrangement functionally attached to said receiving unit, said probes arrangement having at least two probes configured to create a closed electromagnetic field between them so as to allow improved coupling between a transmitting unit of the conductive charging structure or near field environment and said receiving unit regardless of the position or the orientation of the wireless chargeable device relative to the conductive charging structure or near field environment, and a receiving unit, wherein said configuring is selected from adjusting the structure (i.e. shape) of the at least two probes, the length of the probes, the angle between pairs of probes, the connection of each probe to the receiving unit, or combinations thereof;

wherein said improved coupling between the receiving unit attached to the probes arrangement and the transmitting unit of the conductive charging structure or near field environment allows a high RF transfer efficiency between said units.

12. The wireless chargeable device according to claim 11 wherein said conductive charging structure or near field environment having a transmitting unit is adapted to confine the transmitted RF energy to a charging zone, and said probes arrangement is configured to increase the dimensions of the charging zone relative to at least one of the following characteristics: (a) the number of probes in the arrangement; and (b) the structure or the positioning of the entire probes arrangement projection over X-Y-Z axis.

13. A charging system for near field environment or for a close or half close conductive charging chamber, the charging system comprising a conductive charging structure or a near field environment having a transmitting unit for transmitting RF energy, and a wireless chargeable device according to claim 12, configured to be positioned onto or within said conductive charging structure or in near field environment with respect to said conductive charging structure or near field environment, wherein said configuring is selected from adjusting the structure (i.e. shape) of the at least two probes, the length of the probes, the angle between pairs of probes, the connection of each probe to the receiving unit, or combinations thereof.

14. The wireless chargeable device according to claim 11, wherein said at least two probes have a similar structure or length.

15. The wireless chargeable device according to claim 11 wherein said at least two probes differ from the other probe/s in structure and length.

16. The wireless chargeable device according to claim 11 wherein at least one probe is branched.

17. The wireless chargeable device according to claim 11, wherein said probes arrangement attached to the receiving unit is configured to stabilize the receiving unit in a manner that the dimensions of the charging zone created increase, such that efficient charging of the chargeable device is maintained regardless of the position or orientation of the chargeable device.

18. The wireless chargeable device according to claim 11, wherein said probes arrangement attached to the receiving unit is configured to minimize electromagnetic influence created by the conductive charging device or reflected from the near field surroundings for obtaining high RF energy transfer efficiency to the receiving unit of the wireless chargeable device.

19. A wireless chargeable device according to claim 11, wherein the probes arrangement consists of two probes, wherein a first probe of said two probes is connected to a positive input of the receiving unit and a second probe of said two probes is connected to a negative input of the receiving unit, the first and second probes being printed on a flex PCB also comprising said receiving unit, the first and second probes being branched and having various dimensions over axis X-Y-Z.

* * * * *